US009113148B2

(12) United States Patent
Chida

(10) Patent No.: US 9,113,148 B2
(45) Date of Patent: Aug. 18, 2015

(54) THREE-DIMENSIONAL MEASUREMENT SYSTEM AND METHOD

(71) Applicant: CANON KABUSHIKI KAISHA, Tokyo (JP)

(72) Inventor: Makoto Chida, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 13/755,365

(22) Filed: Jan. 31, 2013

(65) Prior Publication Data

US 2013/0201287 A1 Aug. 8, 2013

(30) Foreign Application Priority Data

Feb. 3, 2012 (JP) ................................. 2012-022438

(51) Int. Cl.
*H04N 13/02* (2006.01)
*H04N 13/00* (2006.01)
*G01B 11/25* (2006.01)

(52) U.S. Cl.
CPC ........ *H04N 13/0051* (2013.01); *G01B 11/2513* (2013.01); *H04N 13/0253* (2013.01)

(58) Field of Classification Search
USPC ........... 348/46, 47, 48, 42, 25, 51, 53, 73, 94, 348/115, 135, 136, 137, 140, 142, 151, 153, 348/159, 169, 180, 194, 208.14, 211.9, 241, 348/348, 362, 370, 414.1, 417.1, 418.1, 348/422.1, 423.1, 425.4, 425.2, 464, 466, 348/500, 521, 553, 682, 744; 382/103, 106, 382/153, 154, 199; 345/6, 419, 426, 619; 356/601, 603, 606, 610
See application file for complete search history.

(56) References Cited

U.S. PATENT DOCUMENTS

| 6,812,964 | B1 * | 11/2004 | Tani et al. ...................... 348/296 |
| 8,830,304 | B2 * | 9/2014 | Miyatani et al. ................ 348/47 |
| 2003/0107568 | A1 * | 6/2003 | Urisaka et al. ................. 345/419 |
| 2004/0131339 | A1 * | 7/2004 | Shinozaki et al. .............. 386/96 |
| 2005/0185678 | A1 * | 8/2005 | Tsuchinaga et al. ........... 370/528 |
| 2006/0055943 | A1 * | 3/2006 | Kawasaki et al. ............. 356/606 |
| 2006/0239538 | A1 * | 10/2006 | Sato et al. ...................... 382/154 |
| 2007/0031029 | A1 * | 2/2007 | Sasaki ............................ 382/154 |
| 2007/0090189 | A1 * | 4/2007 | Suwa et al. .................... 235/454 |
| 2009/0310019 | A1 * | 12/2009 | Ohno ............................. 348/553 |

(Continued)

FOREIGN PATENT DOCUMENTS

| JP | 2003-532062 A | 10/2003 |
| JP | 4391137 B2 | 12/2009 |

*Primary Examiner* — Jefferey Harold
*Assistant Examiner* — Mustafizur Rahman
(74) *Attorney, Agent, or Firm* — Canon USA Inc. IP Division

(57) ABSTRACT

A three-dimensional measurement system includes a projector 102, a camera 103, and a PC 101 which obtains distance information from images captured by the camera 103. Further, the three-dimensional measurement system includes a synchronization control apparatus 104 connected to the PC 101 via a video output I/F 105 and a video input I/F 108, to the projector 102 via a video output I/F 102, and to the camera 103 via the video input I/F 107. The synchronization control apparatus 104 performs synchronization control of the projector 102 and the camera 103 based on an instruction from the PC 101. Further, the synchronization control apparatus 104 detects an error, embeds the error information in the captured image input from the video input I/F 107, and outputs the processed captured image to the PC 101 via the video input I/F 108.

10 Claims, 11 Drawing Sheets

(56) References Cited

U.S. PATENT DOCUMENTS

2010/0195114 A1* 8/2010 Mitsumoto et al. ........... 356/601
2011/0228043 A1* 9/2011 Masuda et al. .................. 348/36
2011/0234758 A1* 9/2011 Tsuboi et al. ................... 348/46

* cited by examiner

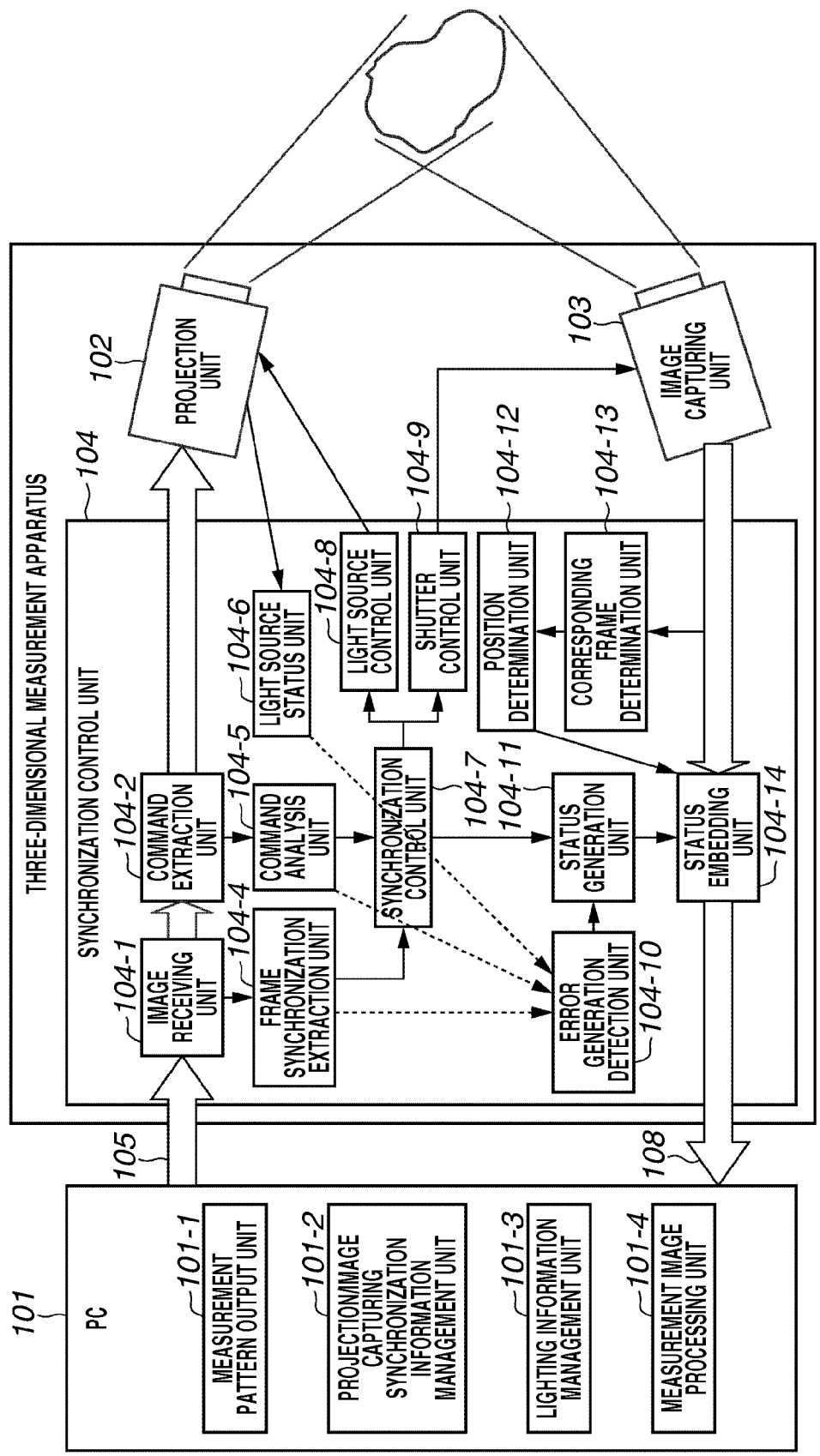

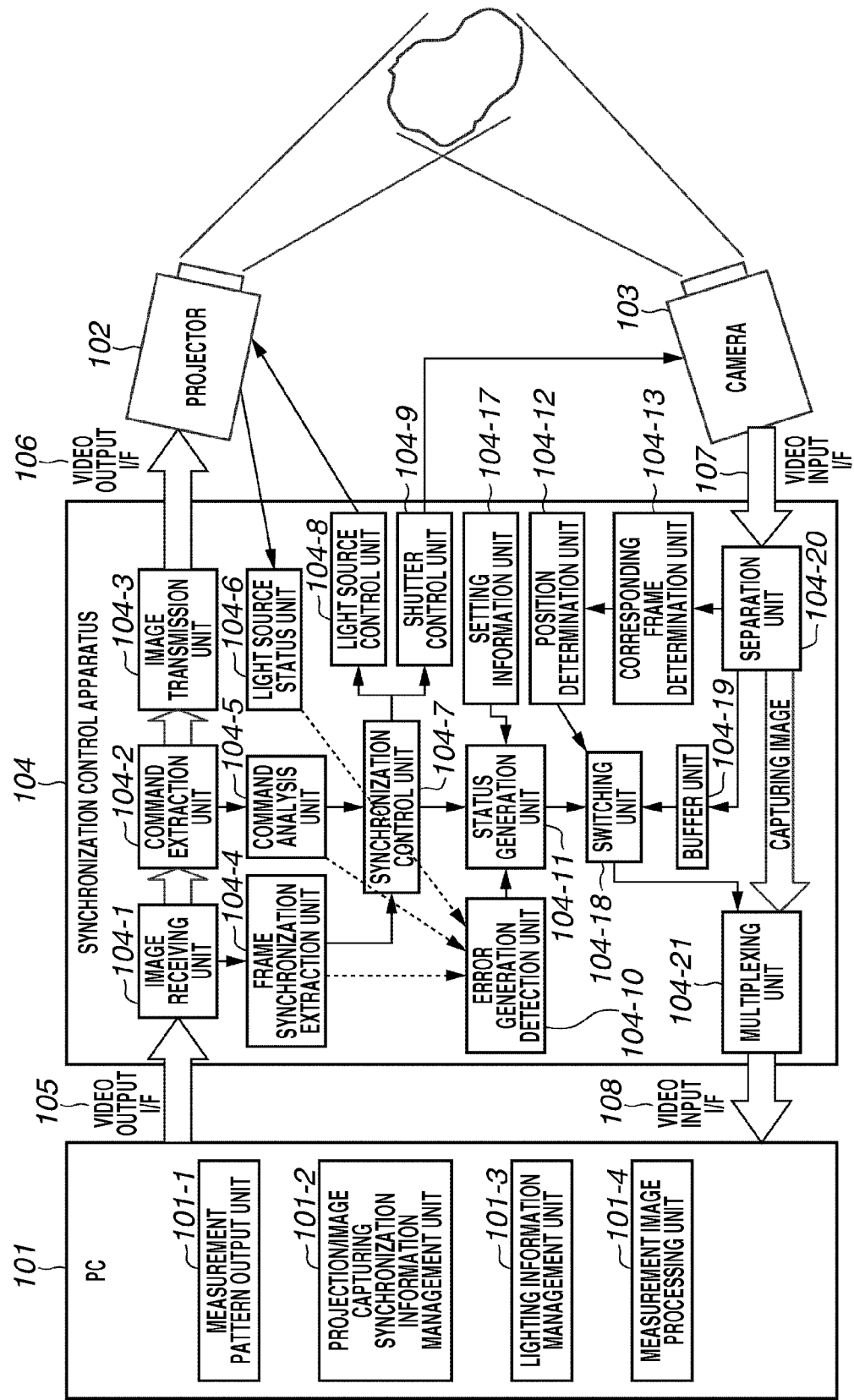

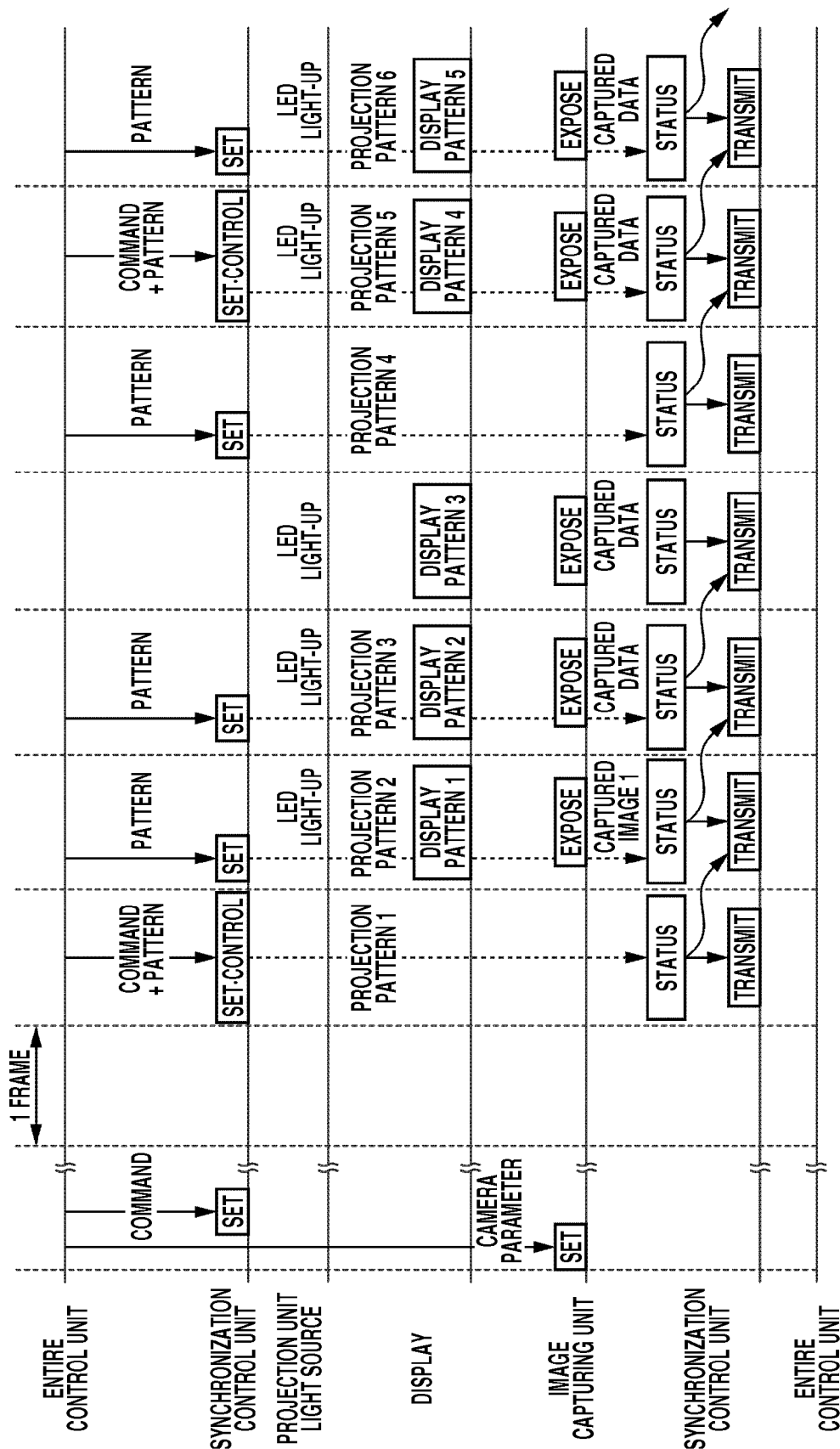

THREE-DIMENSIONAL MEASUREMENT SYSTEM AND METHOD

BACKGROUND OF THE INVENTION

1. Field of the Invention

The present invention relates to a three-dimensional measurement system which projects a pattern image on an object to be measured, and captures the pattern image to acquire distance information.

2. Description of the Related Art

The three-dimensional measurement technique is a technical element in the field of industrial machine vision. A method for performing three-dimensional measurement using machine vision will be described below. A measurement target object is irradiated with two-dimensional pattern light, and the obtained pattern projection image is captured by a camera. The captured image is then analyzed by a computer based on periodicity of the two-dimensional pattern, and distance information of the measurement target object is obtained. The distance information is a distance between the measurement target object and the camera, or the distance in a depth direction, such as surface unevenness. Since the information on a width direction and a height direction can be obtained from a two-dimensional captured image, three-dimensional space information can thus be obtained. Three-dimensional model fitting is then performed using the two-dimensional captured image, the distance information, and previously-stored model information of the measurement target object. A position, an orientation, and a three-dimensional shape of the measurement target object are thus measured.

For example, the three-dimensional measurement technique is used in robot arms for picking parts and performing assembly in manufacturing lines of plants. The position, the orientation, and the three-dimensional shape of the parts are measured using the three-dimensional measurement technique. The robot arm is then controlled based on the obtained information, so that the robot arm can efficiently and accurately pick the parts and perform assembly.

The three-dimensional measurement method employing the two-dimensional pattern, which includes a spatial coding method and a phase shift method, can double as image recognition processing to be an effective method. Further, a projector can causes the patterns change to project the patterns, so that pattern projection by the projector is effective in the three-dimensional measurement method such as the spatial coding method and the phase shift method which requires a plurality of patterns.

The projector is capable of switching the patterns at a frame rate of 30 to 60 fps or greater to project the patterns. The camera is similarly capable of capturing the images at a high frame rate, and resolutions of the projector and the camera have also improved. As a result, if measurement is performed with the pattern changing for each frame, three-dimensional measurement can be performed with high accuracy and speed.

Japanese Patent No. 4391137 discusses a measurement apparatus for measuring a three-dimensional curved surface shape, including a pattern projection unit capable of projecting an arbitrary pattern on a surface of a object to be measured. Further, the measurement apparatus includes an image capturing unit for capturing, while shifting one or more slits projected on the surface of the object to be measured in a direction perpendicular to the slit, one or more types of patterns including at least a pattern that is projected a plurality of times from a direction other than a direction of projection. Furthermore, the measurement apparatus includes a shape calculation unit for performing image processing on the captured pattern projection image and calculating a three-dimensional curved surface shape of the object to be measured.

Moreover, Japanese Patent Application Laid-Open No. 2003-532062 discusses a digitizer having functions for performing stereoscopic vision of the target object, three-dimensional (3D) digitization of color, and motion capturing. The digitizer includes a base that supports two projection mechanisms configured with two cameras and projectors. One of the projection mechanisms includes a diffraction grating element for projecting an encoded pattern on the surface of the target object, and is used for performing active sensing of a 3D range. The other projection mechanism is used for obtaining texture information of the target object. The camera and the optical projector are arranged at an angle with each other to have optical axes that converge through one point. Further, a computer operates the projector according to a selected function, and processes a video signal generated by the camera.

However, the above-described conventional techniques have the following problems. Referring to FIG. 10, the three-dimensional measurement system basically includes a camera 203, a projector 202, and a personal computer (PC) 201. A synchronization control apparatus 204 is further added between the PC 201 and the projector 202, and synchronizes pattern projection performed by the projector 202 and image capturing performed by the camera 203. Further, in the three-dimensional measurement system, the PC 201 and the synchronization control apparatus 204 are connected via a video output interface (I/F) 205, and the synchronization control apparatus 204 and the projector 202 are connected via a video output I/F 206. In such a system, the PC 201 can only output video data to the synchronization control apparatus 204 or the projector 202.

To solve such a problem, a command from the PC 201 is transmitted by superimposing the command on the video data, and the synchronization control apparatus 204 extracts the superimposed command. The PC 201 thus becomes capable of transmitting the command to the synchronization control apparatus 204.

However, when the video output I/F is employed, the video data is transmitted in only one direction from the PC 201 to the synchronization control apparatus 204. The synchronization control apparatus 204 thus cannot return a status to the PC 201.

If a dedicated transmission unit for returning the status from the synchronization control apparatus 204 to the PC 201 is then to be realized, it becomes necessary to add other I/F to both the PC 201 and the synchronization control apparatus 204 (refer to dotted-line arrow illustrated in FIG. 10). In such a case, the system size increases, and it also becomes necessary to newly develop and implement communication software for the I/F, causing an increase in operation man-hours and cost.

However, if there is no dedicated transmission unit for returning the status from the synchronization control apparatus 204 to the PC 201, there is no means for informing the PC 201, for example, when the status is error information. The system may thus perform measurement in an error state. Further, the system may become aware of the error after analyzing the captured image, so that there is a great delay in responding to the error.

Japanese Patent No. 4391137 connects the PC to the camera and the projector, and performs projection and image capturing by synchronizing timings of the projector and the camera. However, since there is no synchronization control device and the PC internally adjusts the timing, it is difficult to increase the processing speed. Further, Japanese Patent No.

4391137 does not discuss transmitting to the PC the statuses of the projection and image capturing processes.

Furthermore, Japanese Patent Application Laid-Open No. 2003-532062 discusses as an external I/F of the apparatus, control signals for setting operations of the camera and the projector, and a video signal from the camera. However, since the projector only includes a lamp, there is no video input signal. Further, there are no signals to be output with respect to the statuses of the camera and the projector.

SUMMARY OF THE INVENTION

The present invention is directed to a three-dimensional measurement system capable of preventing measurement errors and improving measurement accuracy and measurement operation rate.

According to an aspect of the present invention, a three-dimensional measurement system includes a projection apparatus configured to project a pattern image on a measurement target object, an image capturing apparatus configured to capture a pattern image projected by the projection apparatus on the measurement target object, a control apparatus configured to obtained distance information from a captured image captured by the image capturing apparatus, and a synchronization control apparatus connected to the control apparatus via a first video output I/F and a first video input I/F, connected to the projection apparatus via a second video output I/F, and connected to the image capturing apparatus via a second video input I/F, and configured to perform synchronization control of the projection apparatus and the image capturing apparatus based on an instruction from the control apparatus. The synchronization control apparatus includes an error detection unit configured to detect an error, an embedding unit configured to embed error information detected by the error detection unit in a captured image input from the second video input I/F, and an output unit configured to output to the control apparatus via the first video input I/F the captured image in which the error information has been embedded, and the control apparatus includes an extraction unit configured to extract the error information from the captured image in which the error information has been embedded.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates a three-dimensional measurement system according to a third exemplary embodiment.

FIG. 8 illustrates a three-dimensional measurement system according to a fourth exemplary embodiment.

FIG. 9 is a sequence diagram illustrating an operation performed by the three-dimensional measurement system according to the fourth exemplary embodiment.

DESCRIPTION OF THE EMBODIMENTS

Various exemplary embodiments, features, and aspects of the invention will be described in detail below with reference to the drawings.

Figure 1:
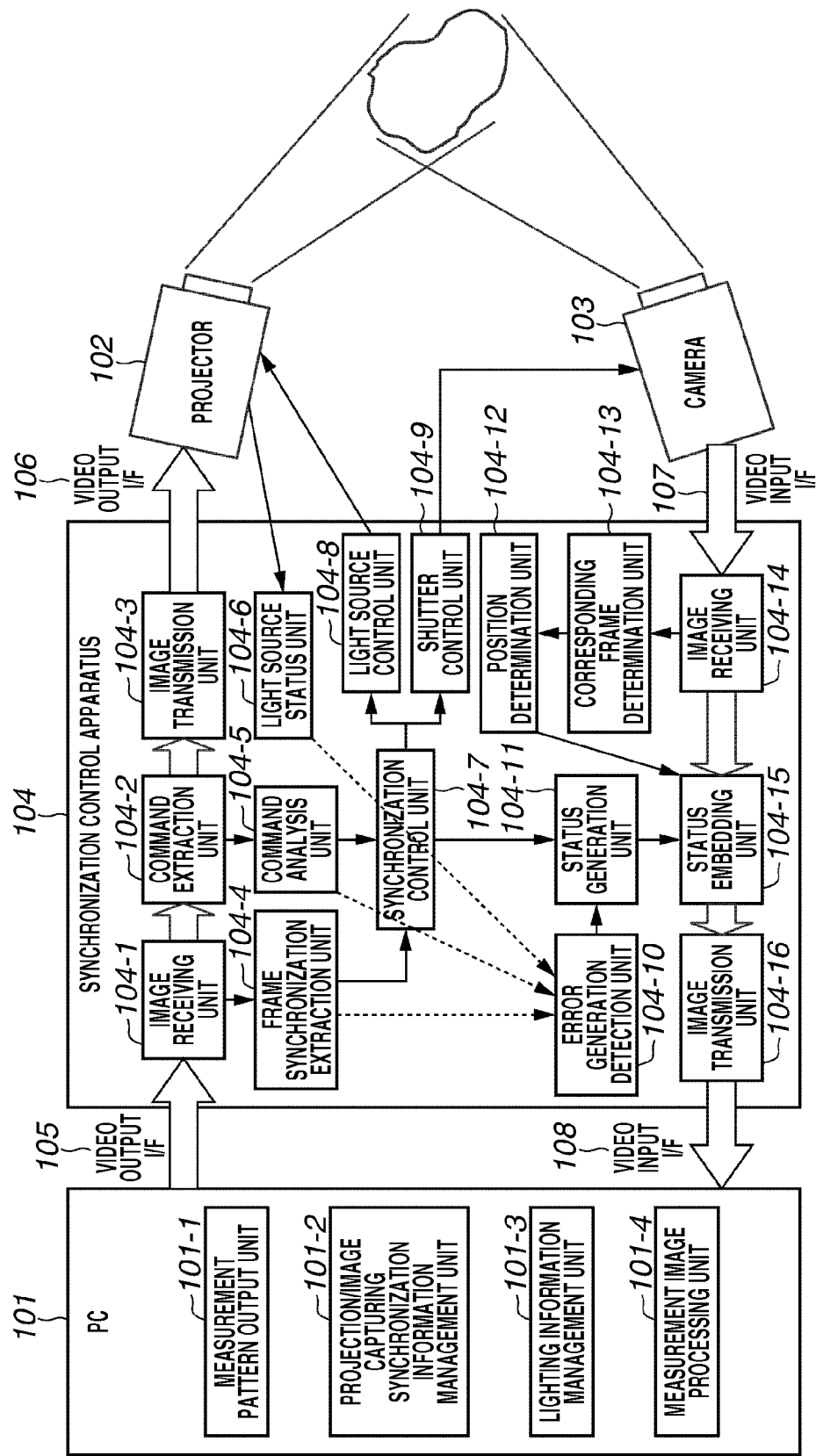
FIG. 1 illustrates configuration of a three-dimensional measurement system according to a first exemplary embodiment.

The first exemplary embodiment will be described below. FIG. 1 illustrates a configuration of the three-dimensional measurement system according to the first exemplary embodiment. Referring to FIG. 1, the three-dimensional measurement system includes a PC 101, i.e., a control apparatus, a projector 102, i.e., a projection apparatus, a camera 103, i.e., an image capturing apparatus, and a synchronization control apparatus 104.

The PC 101 and the synchronization control apparatus 104 are connected via a video output I/F 105, i.e., a first video output I/F, and a video input I/F 108, i.e., a first video input I/F. Further, the synchronization control apparatus 104 and the projector 102 are connected via a video output I/F 106, i.e., a second video output I/F, and the synchronization control apparatus 104 and the camera 103 are connected via a video input I/F 107, i.e., a second video input I/F. Examples of the video output I/F are analog RGB I/F, digital video I/F (DVI), and high-definition multimedia I/F (HDMI). Further, examples of the input video I/F are analog video I/F, camera link I/F, and Institute of Electrical and Electronics Engineers (IEEE) 1394 I/F.

The PC 101 transmits to the synchronization control apparatus 104 via the video output I/F 105, pattern image data to be used in performing measurement generated by a measurement pattern output unit 101-1. A projection/image capturing synchronization information management unit 101-2 generates synchronization control information for synchronizing the projection timing and the image capturing timing. A lighting information management unit 101-3 generates lighting control information for controlling lighting of a light source in the projector 102. The PC 101 superimposes the synchronization control information and the lighting control information on the pattern image data, and transmits the pattern image data to the synchronization control apparatus 104. Further, the PC 101 may embed or superimpose on the pattern image data, commands to be transmitted at the same time as the image data. Such commands include various control commands that are necessary, including a start command that notifies of starting projection.

When performing three-dimensional measurement by projecting the pattern image, the synchronization control apparatus 104 adjusts the projection start timing of the projector 102 and the image capturing start timing of the camera 103 based on an instruction from the PC 101, and performs synchronization control thereof. As a result, it is realized that the projector 102 and the camera 103 can perform measurement at high speed in frame unit.

The PC 101 previously stores the synchronization control information to be used by the synchronization control apparatus 104 for synchronizing both the timing of the projector 102 and timing of the camera 103. Further, the PC 101 reads and transmits to the synchronization control apparatus 104 the stored synchronization control information, and also transmits the control command to the synchronization control apparatus 104 as necessary. The synchronization control apparatus 104 then sets the received synchronization control information, and generates synchronization signals of both the projector 102 and the camera 103 according to the control command.

The projector 102 receives from the synchronization control apparatus 104 the pattern image data and the synchronization signal of the projector, and drives a display unit. Further, the projector 102 receives a synchronization signal of the light source, generated from the lighting timing information received from the PC 101. The projector 102 then lights the light-emitting diode (LED), i.e., the light source, and projects the pattern image on the measurement target object.

The camera 103 receives from the synchronization control apparatus 104 the synchronization signal of the camera, and captures the pattern image projected on the measurement target object. The camera 103 then transmits to the synchronization control apparatus 104 the data of the captured image via the video input I/F 107.

The PC 101 receives from the synchronization control apparatus 104 via the video input I/F 108 the data of the image captured by the camera 103. A measurement image processing unit 101-4 then analyzes the received image data, extracts edge position information of the pattern. The measurement image processing unit 101-4 generates the distance information map using trigonometry based on base-line lengths of the projector 102 and the camera 103 and the distances to the measurement target object.

The projector 102 and the camera 103 are set so that a horizontal scanning direction of projection performed by the projector 102 is in the same direction as the horizontal scanning direction of image capturing performed by the camera 103. However, the horizontal scanning directions of the projector 102 and the camera 103 may be in opposite directions. Further, the camera 103 includes a function for setting an image capturing region to an arbitrary region within a range of a projection region of the projector 102 by region of interest (ROI) control, and performing image capturing. As a result, efficiency and speed of image capturing processing are improved.

The configuration of the synchronization control apparatus 104 will be described below. An image receiving unit 104-1 receives the pattern image data from the PC 101 via the video output I/F 105. The image receiving unit 104-1 then transmits the synchronization signal of the received pattern image to a frame synchronization extraction unit 104-4, and transmits the pattern image data to a command extraction unit 104-2.

The frame synchronization extraction unit 104-4 extracts synchronization timing from the synchronization signal and transmits to a synchronization control unit 104-7 the synchronization timing.

The command extraction unit 104-2 extracts the synchronization control information, the lighting control information, and the control commands embedded or superimposed in the pattern image data. A command analysis unit 104-5 analyzes the information and the commands extracted by the command extraction unit 104-2, and transmits the information and the commands to a synchronization control unit 104-7.

An image transmission unit 104-3 outputs to the projector 102 via the video output I/F 106 the received pattern image data.

The synchronization control unit 104-7 performs control according to the information and the commands transmitted from the command analysis unit 104-5. For example, the synchronization control unit 104-7 transmits to a light source control unit 104-8, lighting start timing and a lighting period, and transmits to a shutter control unit 104-9, shutter start timing and an exposure period, and performs control. The synchronization control unit 104-7 controls the start timing by receiving as the synchronization control information a difference in the timing with respect to the synchronization timing extracted by the frame synchronization extraction unit 104-4, and starts after delaying by the timing difference.

The light source control unit 104-8 controls via a projection control line that is different from the video output I/F 106, the light source in the projector 102. A light source state unit 104-6 receives via the projection control line the status of the light source (e.g., the temperature), and monitors the status.

The shutter control unit 104-9 inputs to an external synchronization input terminal via an image capturing control line that is different from the video input I/F 107, the synchronization signal of the camera, and performs shutter control. The external synchronization input terminal is used for performing a function of the camera 103 for releasing the shutter according to an external trigger.

An error generation detection unit 104-10 functions as an error detection unit, and collects the error information generated in the synchronization control apparatus 104. For example, when the frame synchronization extraction unit 104-4 detects deviation from synchronization in the frame, the error information is generated. Further, when the command analysis unit 104-5 detects information and commands that are beyond a predetermined range, the error information is generated. Furthermore, if the light source status unit 104-6 detects an abnormality, such as the temperature of the light source becoming higher than a predetermined temperature, the error information is generated. The error information is generated when the following cases are detected in addition to detecting the deviation from synchronization, the information and commands beyond the predetermined range, and an abnormality in the light source, an error in a frame number, write failure in a setting register, disconnection in a LED control line, abnormal connection with the projector 102 (or disconnection), abnormal connection with the camera 103 (or disconnection), and stopping the LED from lighting up and the shutter from being on. However, it is not limited thereto, and includes various errors occurring in the synchronization control apparatus 104.

A status generation unit 104-11 generates the status from the error information. An image receiving unit 104-14 receives via the video input I/F 107 the image data captured by the camera 103.

A corresponding frame determination unit 104-13 determines whether the captured image received by the image receiving unit 104-14 has been captured when the status is of the status generated by the status generation unit 104-11, i.e., whether the captured image is a corresponding frame. If the received captured image is the corresponding frame, the corresponding frame determination unit 104-13 transmits the determination result to a position determination unit 104-12. The position determination unit 104-12 then determines whether the frame is a designated region (including a valid image region and an invalid image region) in the captured image. If the frame is the designated region, the position determination unit 104-12 notifies a status embedding unit 104-15 thereof. The status embedding unit 104-15 embeds the status generated by the status generation unit 104-11 in the designated region in the captured image of the corresponding frame. An image transmission unit 104-16 transmits to the PC 101 via the video I/F 108 the captured image in which the status is embedded.

Figure 2:
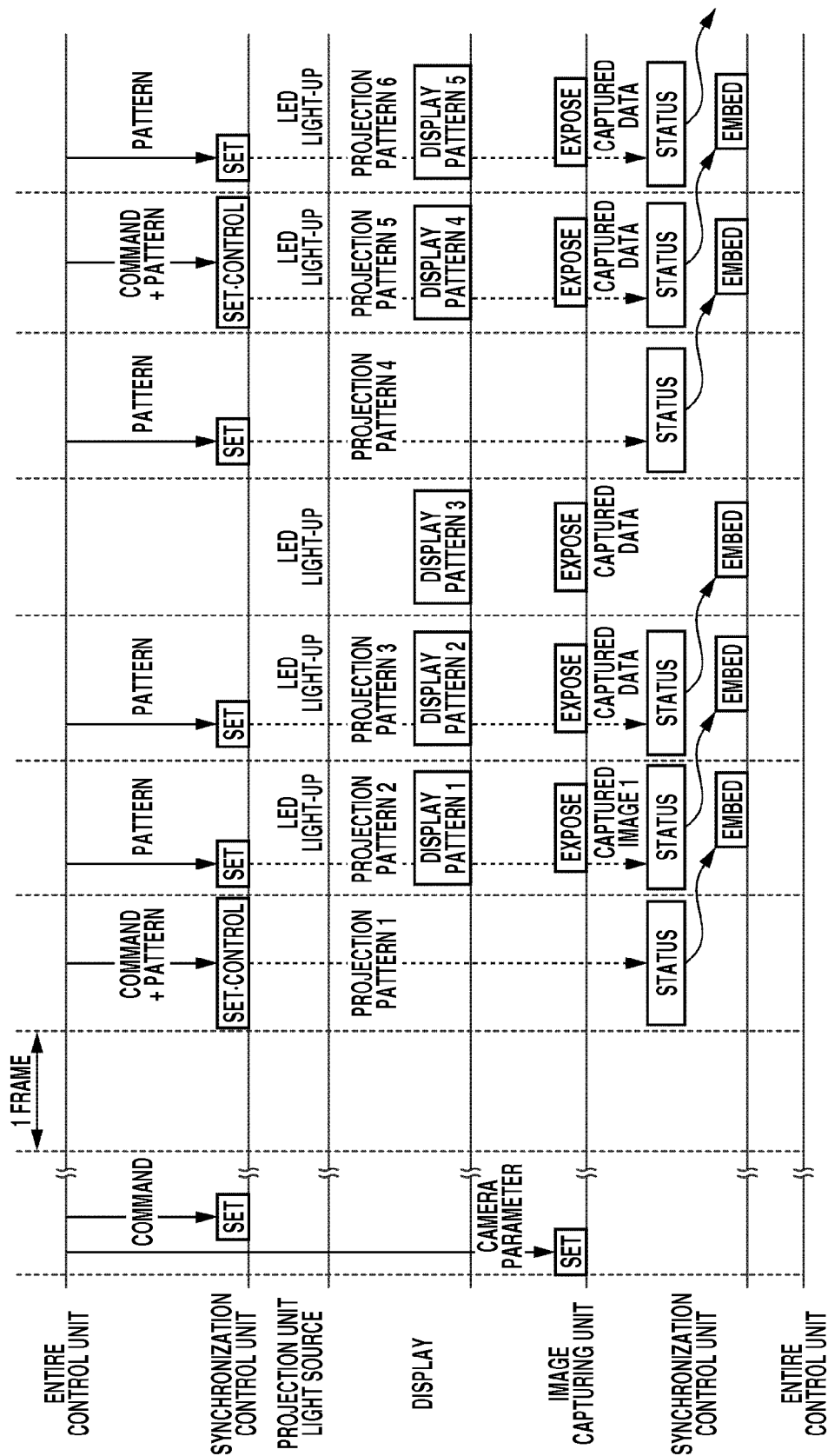
FIG. 2 is a sequence diagram illustrating an operation performed by the three-dimensional measurement system according to the first exemplary embodiment.

FIG. 2 is a sequence diagram illustrating the operations performed by the three-dimensional measurement system according to the first exemplary embodiment. Referring to FIG. 1, time is indicated on a horizontal axis (time axis), and arrangement of each apparatus is indicated on a vertical axis. More specifically, the PC 101 (i.e., entire control unit in FIG. 2), the synchronization control apparatus 104 (i.e., synchronization control unit in FIG. 2), the projector 102 (i.e., projection unit in FIG. 2), the camera 103 (i.e., image capturing unit in FIG. 2), the synchronization control apparatus 104 (i.e., synchronization control unit in FIG. 2), and the PC 101 (i.e., control unit in FIG. 2) are arranged in vertical descending order. The sequence diagram illustrates the flow of the operations between the apparatuses and within each apparatus for each frame.

In the first frame, the PC 101 transmits to the synchronization control apparatus 104, the synchronization control information and the lighting control information. Further, the PC 101 transmits to the camera 103, various parameters of the camera (e.g., imaging area and position, image bit width, and gain). The PC 101 thus specifies various settings.

In the third frame, the PC 101 transmits to the synchronization control apparatus 104, the initial pattern image and the above-described information and command, and the pattern image is transmitted to the projector 102. The synchronization control apparatus 104 sets the command extracted from the pattern image and generates the status thereof, and the projector 102 receives the pattern image.

In the fourth frame, the projector 102 displays the pattern image received in the third frame, and lights the light source by control of the synchronization control apparatus 104. Further, the camera 103 releases the shutter by control of the synchronization control apparatus 104 and performs exposing. As a result, the camera 103 outputs the captured image of the initial pattern image projected on the measurement target object. The synchronization control apparatus 104 embeds in the image captured in the fourth frame the status generated in the third frame, and transmits the captured image to the PC 101.

In the fifth frame and thereafter, the above-described operations are repeated, so that descriptions will be omitted. Since the synchronization control apparatus 104 previously recognizes that the captured image output from the camera 103 is delayed by one frame, the synchronization control apparatus 104 embeds the status by determining that the captured image delayed by one frame is the captured image of the corresponding frame.

According to the present exemplary embodiment, the captured image is delayed by one frame. However, there are projectors that buffer a number of frames, and in such a case, the corresponding frame is the frame which has been delayed by the number of buffered frames. Further, if the camera 103 buffers the captured images, the corresponding frame is the frame further delayed by the number of buffered captured images.

As described above, the synchronization control apparatus 104 is connected to the PC 101 and the camera 103, and transmits the status thereof to the PC 101. Further, the synchronization control apparatus 104 transmits the status in synchronization with the captured image, so that the synchronization control apparatus 104 accurately notifies the PC 101 of an occurrence of an error. As a result, measurement errors are prevented, and the measurement accuracy and measurement operation ratio are improved.

Further, the synchronization control apparatus 104 uses the video input I/F 108 to transmit the status to the PC 101. It is thus not necessary to add a dedicated transmission unit for the synchronization control apparatus 104 to transmit the status to the PC 101, and is cost-efficient.

The second exemplary embodiment will be described below. According to the second exemplary embodiment, the setting information in addition to the error information is generated as the status and is returned along with the corresponding frame.

Figure 3:
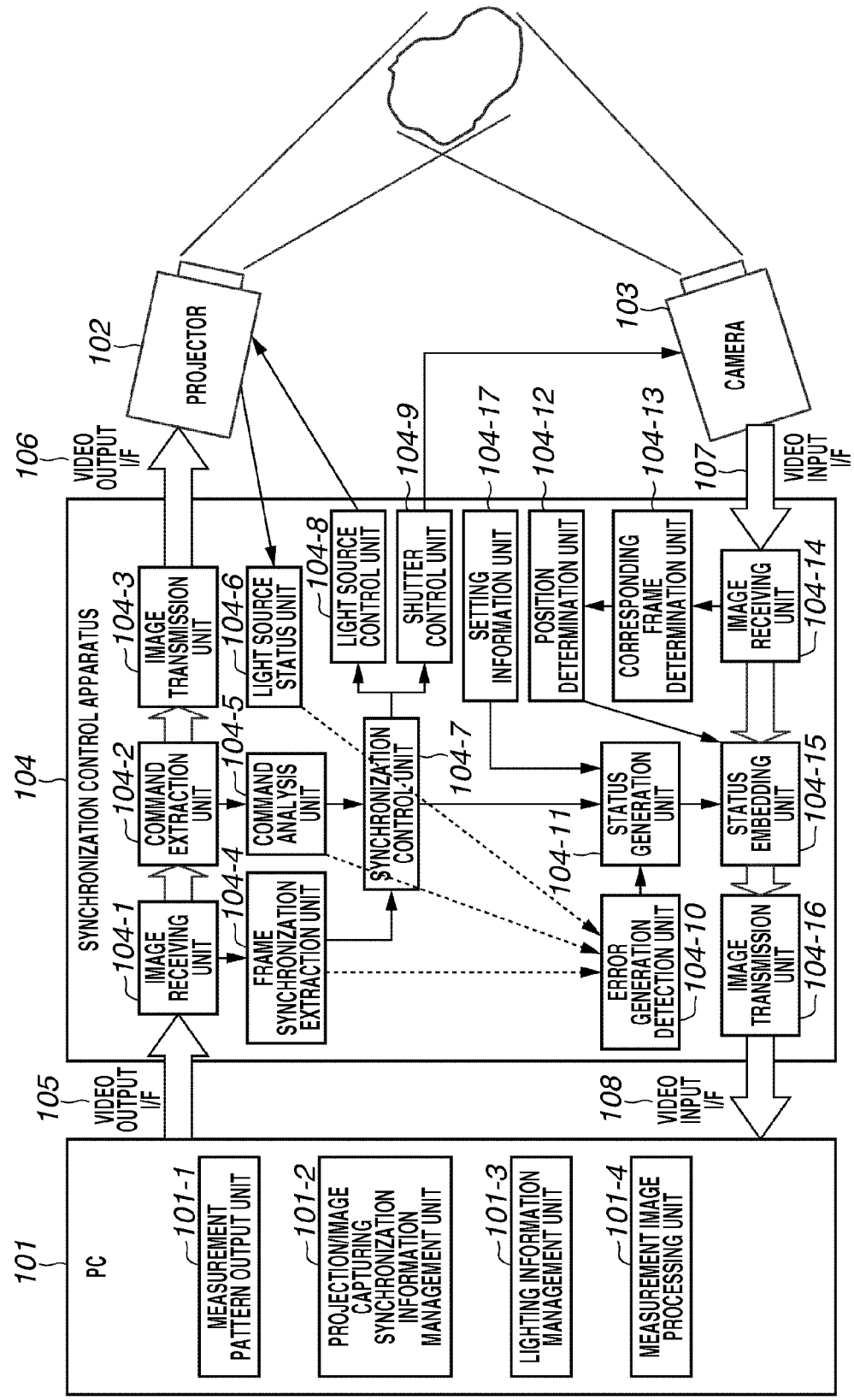
FIG. 3 illustrates configuration of a three-dimensional measurement system according to a second exemplary embodiment.

FIG. 3 illustrates the configuration of the three-dimensional measurement system according to the second exemplary embodiment. The three-dimensional measurement system according to the present exemplary embodiment is different from that according to the first exemplary embodiment in including a setting information unit 104-17, and that the status generation unit 104-11 generating the error information and the setting information as the status. The differences from the first exemplary embodiment will be mainly described below, and detailed descriptions on the similar elements will be omitted.

The setting information unit 104-17 stores various types of parameter setting information the synchronization control unit 104-7 transmits to the light source control unit 104-8 and the shutter control unit 104-9. Further, the setting information unit 104-17 may monitor and store via the video input I/F, various types of parameter setting information of the camera 103 transmitted from the PC 101 to the camera 103.

The setting information unit 104-17 transmits to the status generation unit 104-11 the setting information collected and stored as described above. The status generation unit 104-11 thus generates the status.

The setting information includes in addition to the parameter setting information, the frame number of the image, a time stamp of the image (in which case an internal clock or a timer is necessary), relative time from the first frame, and a temperature sensor value of the LED. However, it is not limited thereto, and may be any information obtainable by the synchronization control apparatus 104.

Figure 4:
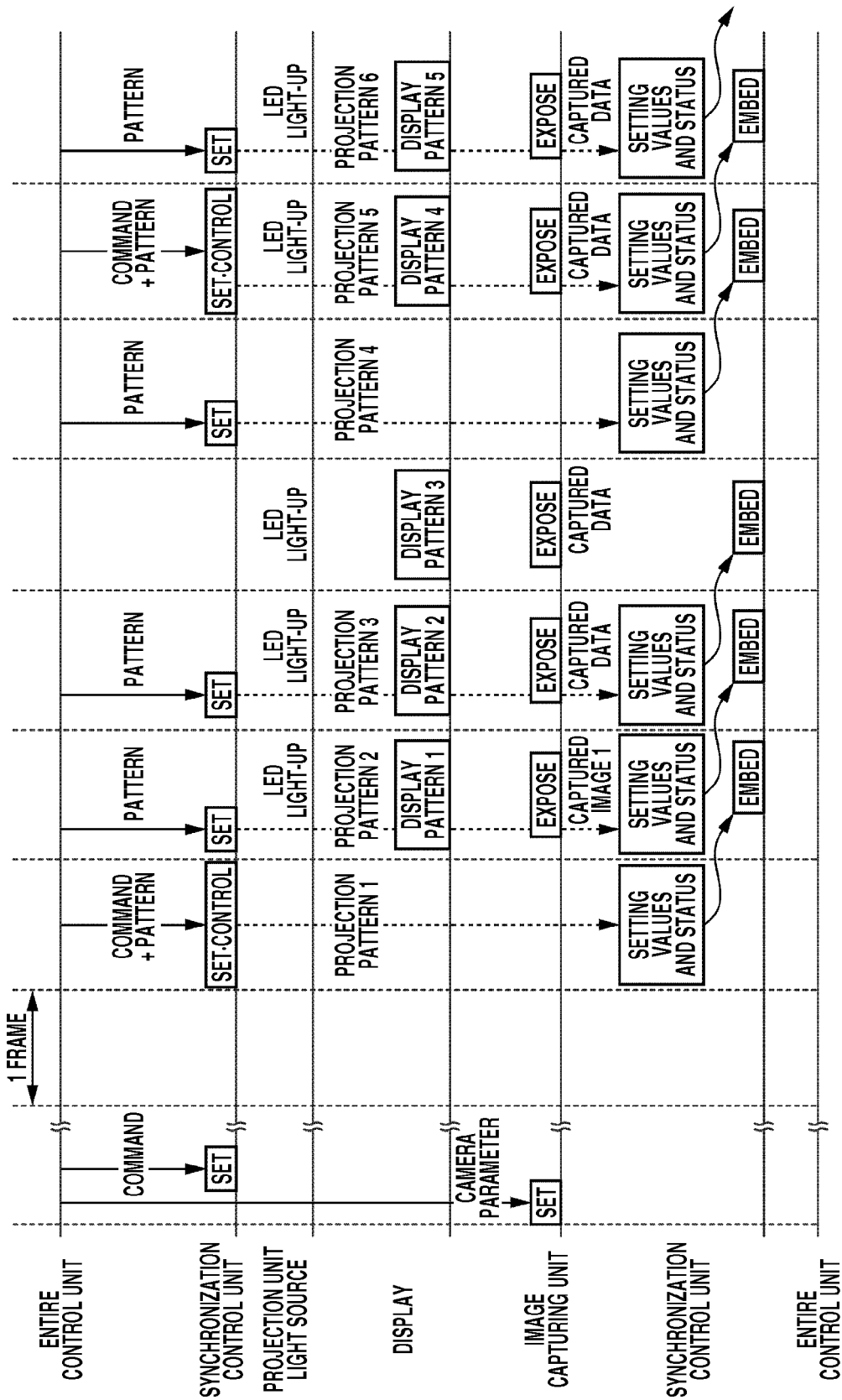
FIG. 4 is a sequence diagram illustrating an operation performed by the three-dimensional measurement system according to the second exemplary embodiment.

FIG. 4 is a sequence diagram illustrating the operations performed by the three-dimensional measurement system according to the second exemplary embodiment. The sequence diagram according to the present exemplary embodiment is different from the sequence diagram according to the first exemplary embodiment illustrated in FIG. 2 in that the setting information is added as the status. As a result, the synchronization control apparatus 104 can transmit to the PC 101, not only the error information but also the setting information thereof or the setting information of the camera 103, embedding the information in an image pattern-projected and captured with setting according to the setting information. The PC 101 can then confirm the parameter setting specified when performing pattern projection and image capturing. Further, the PC 101 can recognize the status information such as the LED temperature at that time.

Figure 5:
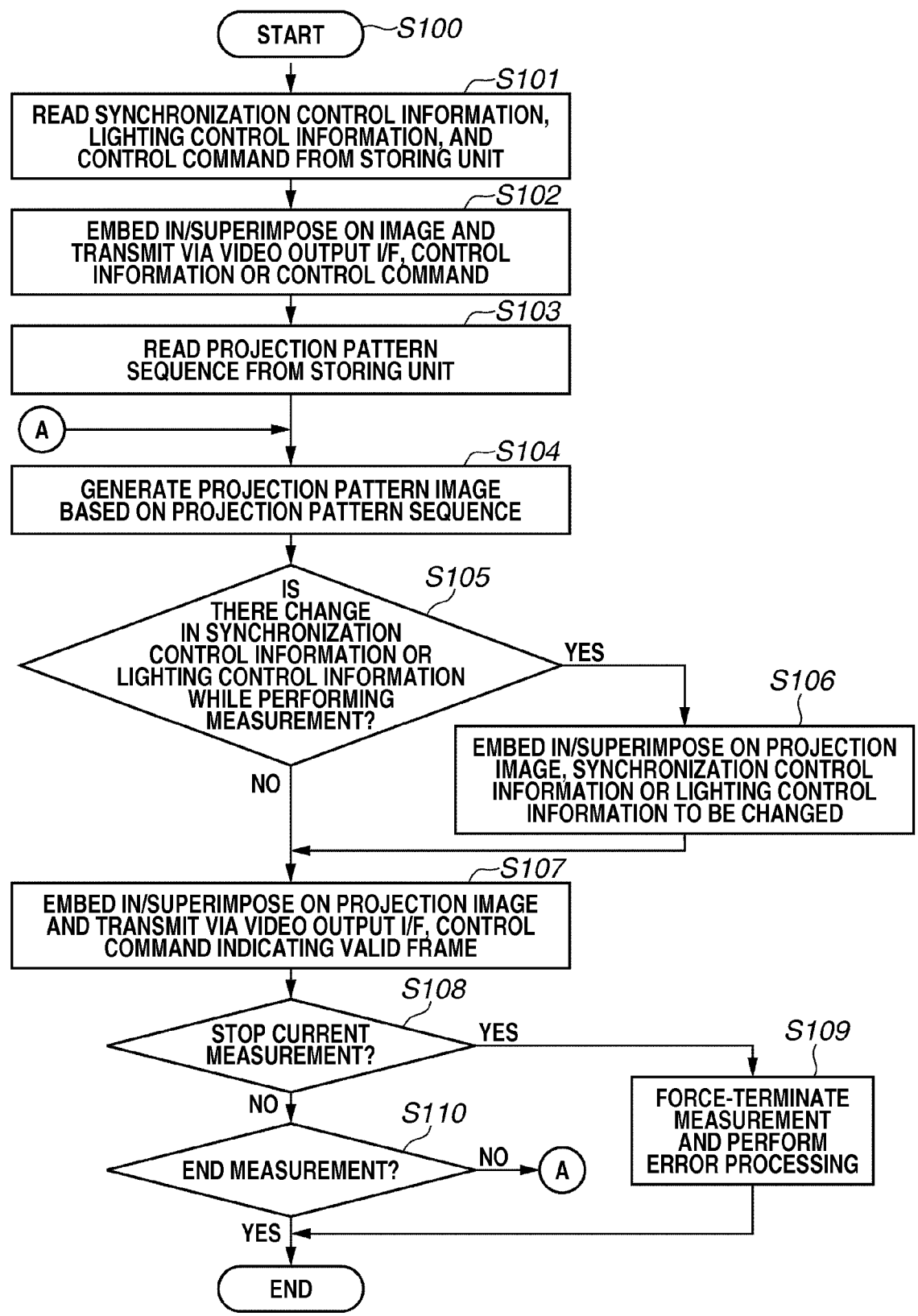
FIG. 5 is a flowchart illustrating an operation performed by a PC in the three-dimensional measurement system according to the second exemplary embodiment.

FIG. 5 is a flowchart illustrating the operation performed on the side of the video output I/F 105 in the PC 101 of the three-dimensional measurement system according to the second exemplary embodiment. The operation performed on the side of the video output I/F 105 in the PC 101 of the three-dimensional measurement system according to the first exemplary embodiment is similar to the operation performed according to the present exemplary embodiment.

In step S100, the PC 101 starts performing measurement. In step S101, the PC 101 reads from the storing unit the necessary synchronization control information, lighting control information, and control command. In step S102, the PC 101 transmits to the synchronization control apparatus 104 via the video output I/F 105 the pattern image by embedding in or superimposing on the image the control information and the control command.

In step S103, the PC 101 reads from the storing unit a projected pattern sequence. In step S104, the PC 101 generates the projection pattern image based on the projection pattern sequence. In step S105, the PC 101 determines whether there is a change in the synchronization control information or the lighting control information while performing measurement. If there is no change (NO in step S105), the process proceeds to step S107, and if there is a change (YES in step S105), the process proceeds to step S106.

In step S106, the PC 101 embeds in or superimposes on the pattern image the synchronization control information or the lighting control information to be changed. In step S107, the PC 101 transmits to the synchronization control apparatus 104 via the video output I/F 105, the control command indicating a valid frame by embedding in or superimposing on the projection pattern image.

In step S108, the PC 101 determines whether to stop performing the current measurement. If the PC 101 determines not to stop performing the current measurement (NO in step S108), the process proceeds to step S110. In step S110, the PC 101 determines whether the measurement has been completed. If the PC 101 determines that the measurement has not been completed (NO in step S110), the process returns to step S104. If the PC 101 determines that the measurement has been completed (YES in step S110), the PC 101 ends the process. If the PC 101 determines to stop performing the current measurement (YES in step S108), the process proceeds to step S109. In step S109, the PC 101 force-terminates the measurement and performs error processing, and ends the process.

The PC 101 performs the above-described operation. As a result, the PC 101 can synchronize, using the synchronization control apparatus 104, the lighting of the light source in the projector 102 and the exposure by the shutter in the camera 103 at the timing of the projector 102 projecting the pattern image on the measurement target object.

Figure 6A:
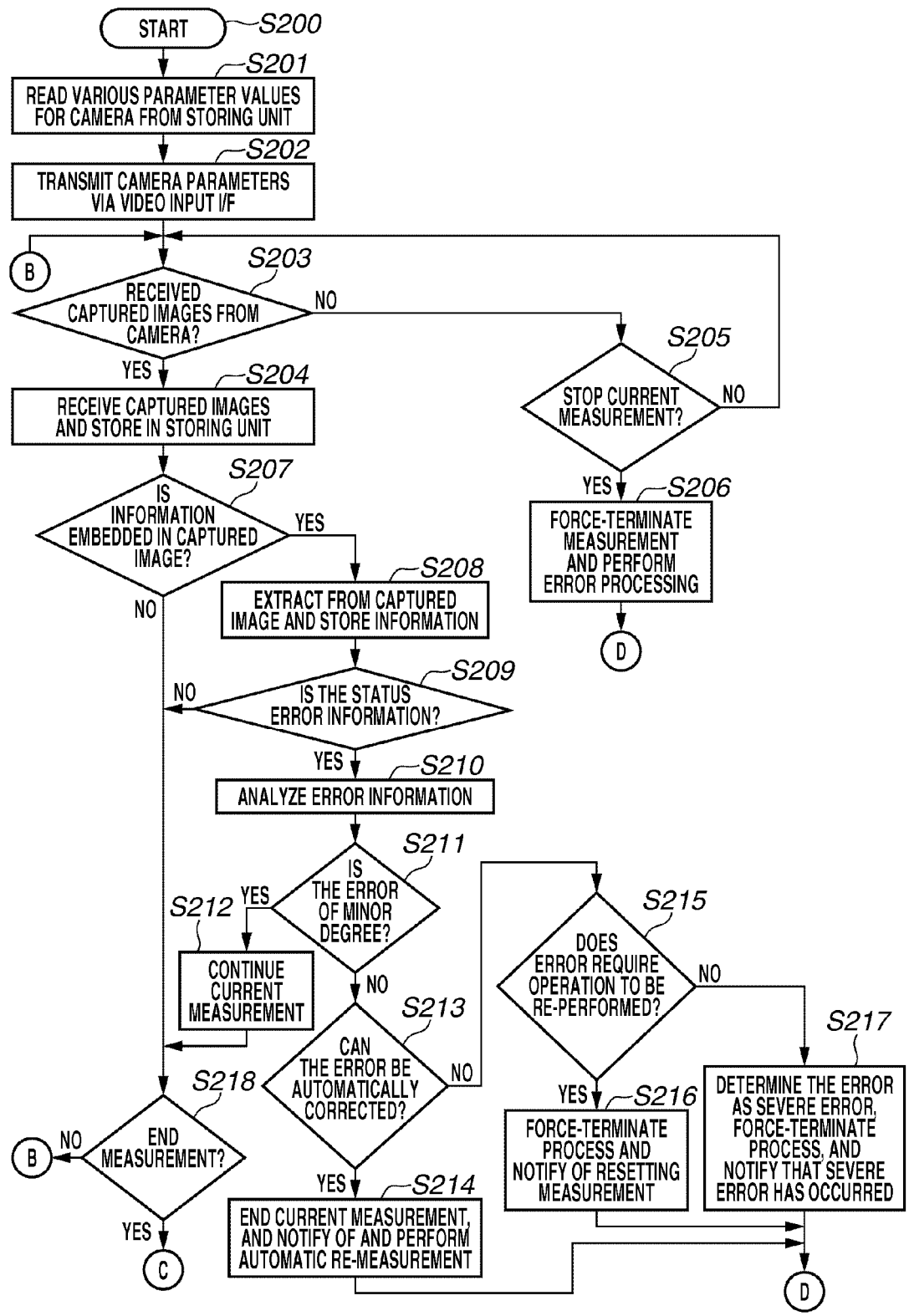
FIGS. 6A and 6B are flowcharts illustrating operations performed by the PC in the three-dimensional measurement system according to the second exemplary embodiment.
Figure 6B:
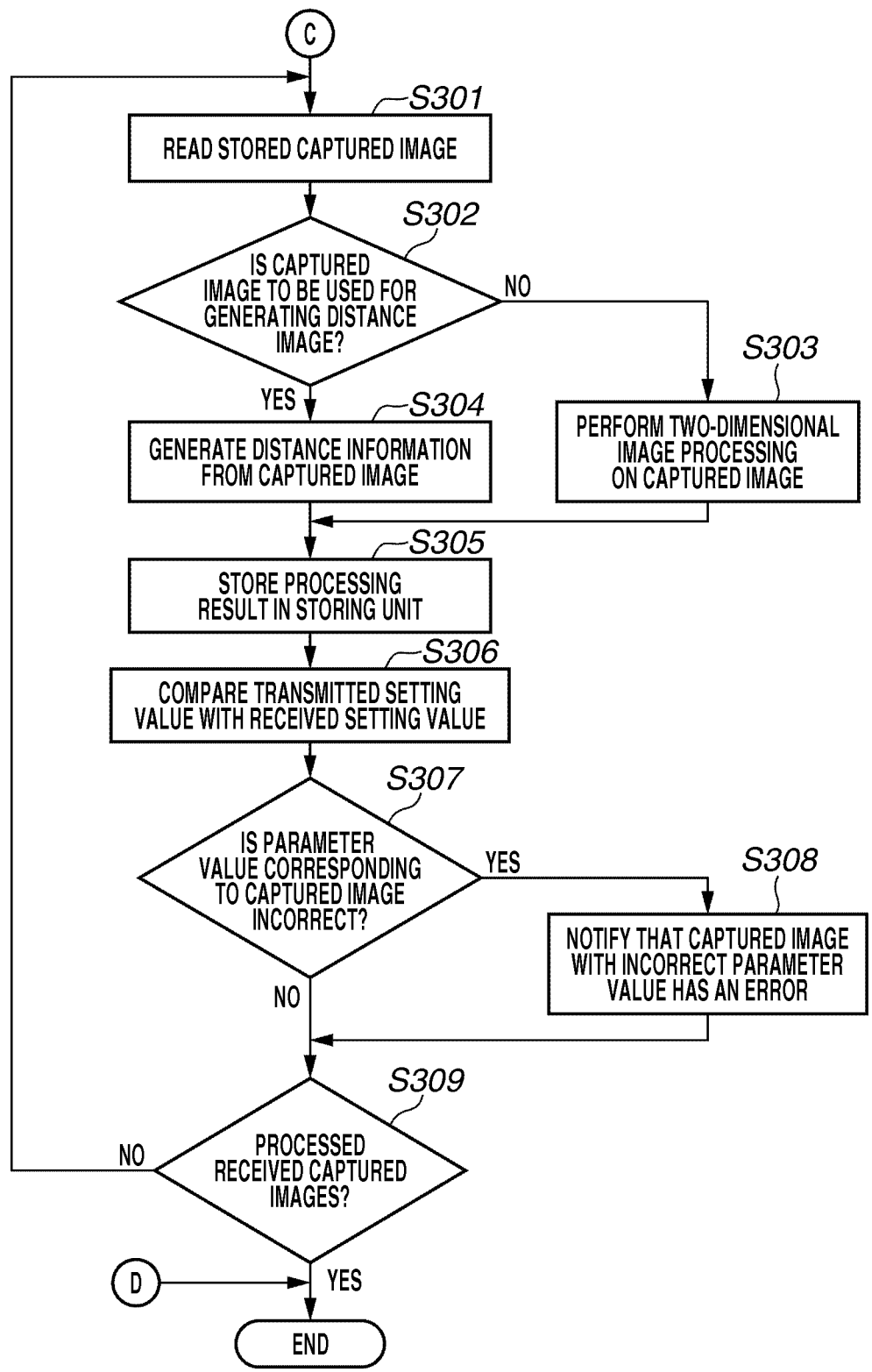
Figure 10:
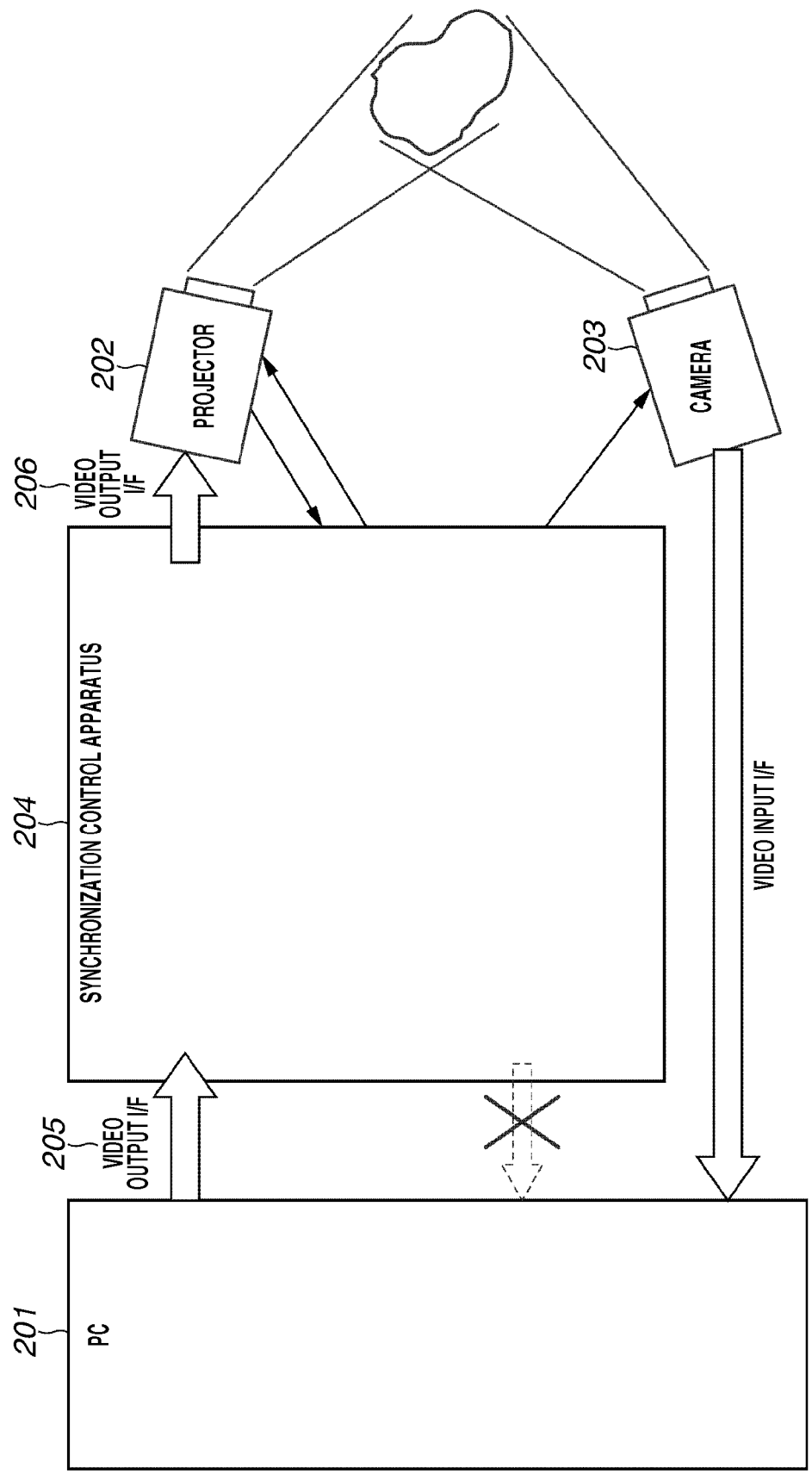
FIG. 10 illustrates a conventional three-dimensional measurement system.

FIGS. 6A and 6B are flowcharts illustrating the operations performed on the side of the video input I/F 108 in the PC 101 of the three-dimensional measurement system according to the second exemplary embodiment. The operation performed on the side of the video output I/F 108 in the PC 101 of the three-dimensional measurement system according to the first exemplary embodiment is similar to those according to the second exemplary embodiment except for a process for comparing the setting information in the second exemplary embodiment (step S306 to step S308 illustrated in FIG. 6B).

In step S200 illustrated in FIG. 6A, the PC 101 starts performing measurement. In step S201, the PC 101 reads from the storing unit, necessary parameter values of the camera. In step S202, the PC 101 transmits the parameter values to the camera 103 via the video input I/F 108.

In step S203, the PC 101 determines whether the captured image is received from the camera 103. If the PC 101 has not received the captured image (NO in step S203), the process proceeds to step S205. In step S205, the PC 101 determines whether to stop performing the current measurement. If the PC 101 determines not to stop performing the current measurement (NO in step S205), the process returns to step S203. If the PC 101 determines to stop performing the current measurement (YES in step S205), the process proceeds to step S206. In step S206, the PC 101 force-terminates the measurement and performs error processing, and ends the measurement process.

If the PC 101 has received the captured image (YES in step S203), the process proceeds to step S204. In step S204, the PC 101 stores the received captured image in the storing unit. In step S207, the PC 101 determines whether the status is embedded in the captured image. If the status is not embedded (NO in step S207), the process proceeds to step S218. In step S218, the PC 101 determines whether the measurement has been completed. If the PC 101 determines that the measurement has not been completed (NO in step S218), the process returns to step S203. If the PC 101 determines that the measurement has been completed (YES in step S218), the process proceeds to step S301 illustrated in FIG. 6B.

If the status is embedded in the captured image (YES in step S207), the process proceeds to step S208. In step S208, the PC 101 extracts from the captured image and stores the status. In step S209, the PC 101 determines whether the status is the error information. If the status is not the error information (NO in step S209), the process proceeds to step S218. If the status is the error information (YES in step S209), the process proceeds to step S210. In step S210, the PC 101 determines whether the error is of a minor degree. If the error is of a minor degree (YES in step S211), the process proceeds to step S212. In step S212, the PC 101 continues the current measurement. The process then proceeds to step S218.

If the error is not of a minor degree (NO in step S211), the process proceeds to step S213. In step S213, the PC 101 determines whether the error can be automatically corrected. If the error can be automatically corrected (YES in step S213), the process proceeds to step S214. In step S214, the PC 101 notifies of and performs automatic re-measurement, and ends the measurement process. On the other hand, if the error cannot be automatically corrected (NO in step S213), the process proceeds to step S215. In step S215, the PC 101 determines whether it is necessary to re-perform the operation to correct the error. If it is necessary to re-perform the operation to correct the error (YES in step S215), the process proceeds to step S216. In step S216, the PC 101 force-terminates the process, notifies of re-setting the measurement, and ends the measurement process. If the error cannot be corrected even when the operation is re-performed (NO in step S215), the process proceeds to step S217. In step S217, the PC 101 determines that the error is severe, force-terminates the process, notifies of an occurrence of a severe error, and ends the measurement process.

In step S301 illustrated in FIG. 6B, the PC 101 reads the stored captured image. In step S302, the PC 101 determines whether the captured image is to be used for generating the distance information. If the captured image is not to be used for generating the distance information (NO in step S302), the process proceeds to step S303. In step S303, the PC 101 performs two-dimensional image processing on the captured image. On the other hand, if the captured image is to be used for generating the distance information (YES in step S302), the process proceeds to step S304. In step S304, the PC 101 generates the distance information from the captured image. In step S305, the PC 101 stores the processing result in the storing unit.

In step S306, the PC 101 compares the synchronization control information and the lighting control information set to and received from the synchronization control apparatus 104, with the synchronization control information and the lighting control information stored in the PC 101. In step S307, the PC 101 determines whether there is inconsistency in values of the above-described control information corresponding to the captured image. If there is inconsistency (YES in step S307), the process proceeds to step S308. In step S308, the PC 101 notifies that there is an error in the captured image in which the inconsistency has been detected. The process then proceeds to step S309. If there is no inconsistency (NO in step S307), the process proceeds to step S309. In step S309, the PC 101 determines whether the received captured image has been processed. If processing has not been completed (NO in step S309), the process returns to step S301. If processing has been completed (YES in step S309), the PC 101 ends the measurement process.

The PC 101 performs the above-described operations, so that the status recognized by the synchronization control apparatus 104 can be obtained, and the errors can be appropriately processed according to the degree of importance. Further, the PC 101 can obtain the parameter setting values of when pattern projection has been performed, so that if the parameter values are not the expected values, the PC 101 can recognize that the captured image is not the desired image data.

The third exemplary embodiment according to the present exemplary embodiment will be described below. According to the third exemplary embodiment, the synchronization control apparatus 104, the projector 102, and the camera 103 are constituted as a three-dimensional measurement apparatus mounted with thereof instead of being separate devices. FIG. 7 illustrates the three-dimensional measurement system according to the third exemplary embodiment. The difference from the first exemplary embodiment is that the synchronization control apparatus 104, the projector 102, and the camera 103 are changed to a synchronization control unit 104, a projection unit 102, and an image capturing unit 103 respectively to be integrated as the three-dimensional measurement apparatus, instead of being separate devices.

In such a case, the PC 101 and the three-dimensional measurement apparatus are connected via the video output I/F 105 and the video input I/F 108, similarly as in the first exemplary embodiment. However, the second video output I/F 106 and the second video input I/F 107 which connect the projector 102 and the camera 103 to the synchronization control apparatus 104 in the first exemplary embodiment become unnecessary.

The synchronization control unit 104 is capable of transmitting to the PC 101 the status via the video input I/F 108 even in such a configuration.

The fourth exemplary embodiment according to the present exemplary embodiment will be described below. According to the fourth exemplary embodiment, the status is returned using a data communication system by separating a multimedia communication system on the video input I/F side.

FIG. 8 illustrates the three-dimensional measurement system according to the fourth exemplary embodiment. The difference from the second exemplary embodiment is that the three-dimensional measurement system according to the present exemplary embodiment includes a switching unit 104-18, a buffer 104-19, a separation unit 104-20, and a multiplexing unit 104-21. The differences from the first and second exemplary embodiments will be mainly described below, and detailed descriptions on the similar elements will be omitted.

The present exemplary embodiment is different from the second exemplary embodiment in that the status is not embedded in the image. It is instead assumed that the I/F includes both an image communication system and the data communication system, and the synchronization control apparatus 104 uses the data communication system to transmit the status to the PC 101.

As a result, it becomes necessary for the synchronization control apparatus 104 to monitor the data communication system between the camera 103 and the PC 101, and transmit the status to the PC 101 by interrupting at appropriate timing, so that the communication from the camera 103 is temporarily delayed during transmission. The synchronization control apparatus 104 can thus realize the transmission by including the separation unit 104-20, the buffer unit 104-19, and the multiplexing unit 104-21, and using the switching unit 104-18 to transmit the status to the PC 101.

The fourth exemplary embodiment may also be applied to the configuration where the synchronization control unit 104, the projection unit 102, and the image capturing unit 103 are integrated as the three-dimensional measurement apparatus.

FIG. 9 is a sequence diagram illustrating the operations performed by the three-dimensional measurement system according to the fourth exemplary embodiment. The differences from the first and second exemplary embodiments are that, since it is not necessary to embed the status in the captured image, the synchronization control apparatus 104 can transmit the status to the PC 101 even when there is no captured image (e.g., as in the case of a third frame or a seventh frame).

As a result, the synchronization control apparatus 104 can transmit the status to the PC 101 at any given time, and the PC 101 can obtain the status. Further, if the status is embedded in the captured image, it is easy to match the captured image and the status. In contrast, according to the present exemplary embodiment, since the communication systems are different, the captured image and the status cannot be easily matched. However, the timings can be proximately matched by transmitting the status in synchronization with the frame timing. Further, the captured image may be associated with the status by embedding identification (ID) in the captured image, and adding the ID to the status.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-022438 filed Feb. 3, 2012, which is hereby incorporated by reference herein in its entirety.

What is claimed is:

1. A three-dimensional measurement system comprising:
a projection apparatus configured to project a pattern image on a measurement target object;
an image capturing apparatus configured to capture an image including the target object on which the pattern image is projected by the projection apparatus;
a control apparatus configured to obtain distance information from a captured image captured by the image capturing apparatus; and
a synchronization control apparatus connected to the control apparatus via a first output interface (I/F) and a first input I/F, connected to the projection apparatus via a second output I/F, and connected to the image capturing apparatus via a second input I/F, and configured to perform synchronization control of the projection apparatus and the image capturing apparatus based on an instruction from the control apparatus,
wherein the synchronization control apparatus comprises:
an error detection unit configured to detect an error;
an embedding unit configured to embed error information detected by the error detection unit in a captured image input from the second I/F; and
an output unit configured to output to the control apparatus via the first input I/F the captured image in which the error information has been embedded, and
wherein the control apparatus comprises an extraction unit configured to extract the error information from the captured image in which the error information has been embedded.

2. The three-dimensional measurement system according to claim 1, further comprising a determination unit configured to determine whether the error information corresponds to a captured image input from the second input I/F,
wherein the embedding unit embeds the error information in a captured image determined by the determination unit to correspond to the error information.

3. The three-dimensional measurement system according to claim 1, wherein the embedding unit embeds information set by the synchronization control apparatus in a captured image input from the second input I/F.

4. The three-dimensional measurement system according to claim 1, wherein the synchronization control apparatus comprises:
an error detection unit configured to detect an error;
a separation unit configured to separate data input from the second input I/F into image communication and data communication;
a unit configured to include in the data communication, error information detected by the error detection unit;
a multiplexing unit configured to multiplex the data communication and the image communication; and
an output unit configured to output from the first input I/F to the control apparatus, data obtained by multiplexing the data communication and the image communication, and
wherein the control apparatus comprises an extraction unit configured to extract the error information from the data obtained by multiplexing the data communication and the image communication.

5. A three-dimensional measurement system comprising:
a three-dimensional measurement apparatus including a projection unit configured to project a pattern image on a measurement target object, an image capturing unit configured to capture an image including the target object on which the pattern image is projected by the projection unit, and a control unit configured to obtain distance information from a captured image captured by the image capturing unit; and
a control apparatus configured to obtain distance information from a captured image captured by the image capturing unit,
wherein the control apparatus and the three-dimensional measurement apparatus are connected via a first output interface (I/F) and a first input I/F,
wherein the synchronization control unit comprises:
an error detection unit configured to detect an error;
an embedding unit configured to embed error information detected by the error detection unit in a captured image input from the image capturing unit; and
an output unit configured to output to the control apparatus via the first input I/F the captured image in which the error information has been embedded, and
wherein the control apparatus comprises an extraction unit configured to extract the error information from the captured image in which the error information has been embedded.

6. The three-dimensional measurement system according to claim 5, wherein the synchronization control unit comprises:
an error detection unit configured to detect an error;
a separation unit configured to separate data input from the image capturing unit into image communication and data communication;
a unit configured to include in the data communication, error information detected by the error detection unit;
a multiplexing unit configured to multiplex the data communication and the image communication; and
an output unit configured to output from the first input I/F to the control apparatus, data obtained by multiplexing the data communication and the image communication, and
wherein the control apparatus comprises an extraction unit configured to extract the error information from the data obtained by multiplexing the data communication and the image communication.

7. A three dimensional measurement method performed by a three-dimensional measurement system comprising:
a projection apparatus configured to project a pattern image on a measurement target object;
an image capturing apparatus configured to capture an image including the target object on which the pattern image is projected by the projection apparatus on the measurement target object;
a control apparatus configured to obtain distance information from a captured image captured by the image capturing apparatus; and
a synchronization control apparatus connected to the control apparatus via a first output interface (I/F) and a first input I/F, connected to the projection apparatus via a second output I/F, and connected to the image capturing apparatus via a second input I/F, and configured to perform synchronization control of the projection apparatus and the image capturing apparatus based on an instruction from the control apparatus,
wherein the synchronization control apparatus performs the method comprising:
detecting an error;
embedding the detected error information in a captured image input from the second input I/F; and
outputting to the control apparatus via the first input I/F the captured image in which the error information has been embedded, and wherein the control apparatus performs the method comprising extracting the error information from the captured image in which the error information has been embedded.

8. The three-dimensional measurement method according to claim 7, wherein the synchronization control apparatus performs the method comprising:
separating data input from the second video input I/F into image communication and data communication;
including the detected error information in the data communication;
multiplexing the data communication and the image communication; and
outputting from the first input I/F to the control apparatus, data obtained by multiplexing the data communication and the image communication, and
wherein the control apparatus performs the method comprising an extraction unit configured to extract the error information from the data obtained by multiplexing the data communication and the image communication.

9. A three-dimensional measurement method performed by a three-dimensional measurement system comprising:
a three-dimensional measurement apparatus including a projection unit configured to project a pattern image on a measurement target object, an image capturing unit configured to capture an image including the target object on which the pattern image is projected by the projection apparatus on the measurement target object, and a control unit configured to obtain distance information from a captured image captured by the image capturing apparatus; and
a control apparatus configured to obtain distance information from a captured image captured by the image capturing unit,
wherein the control apparatus and the three-dimensional measurement apparatus are connected via a first output interface (I/F) and a first input I/F,
wherein the synchronization control apparatus performs the method comprising:
detecting an error;
embedding the detected error information in a captured image input from the image capturing unit; and
outputting to the control apparatus via the first input I/F the captured image in which the error information has been embedded, and
wherein the control apparatus performs the method comprising extracting the error information from the captured image in which the error information has been embedded.

10. The three-dimensional measurement method according to claim 9, wherein the synchronization control unit performs the method comprising:
detecting an error;
separating data input from the image capturing unit into image communication and data communication;
including the detected error information in the data communication;
multiplexing the data communication and the image communication; and
outputting from the first input I/F to the control apparatus, data obtained by multiplexing the data communication and the image communication, and
wherein the control apparatus performs the method comprising extracting the error information from the data obtained by multiplexing the data communication and the image communication.

* * * * *